Feb. 5, 1957  K. SIGVARDT  2,780,490
DEVICE FOR SUBDIVIDING AN AIRSTREAM
Filed Aug. 11, 1953
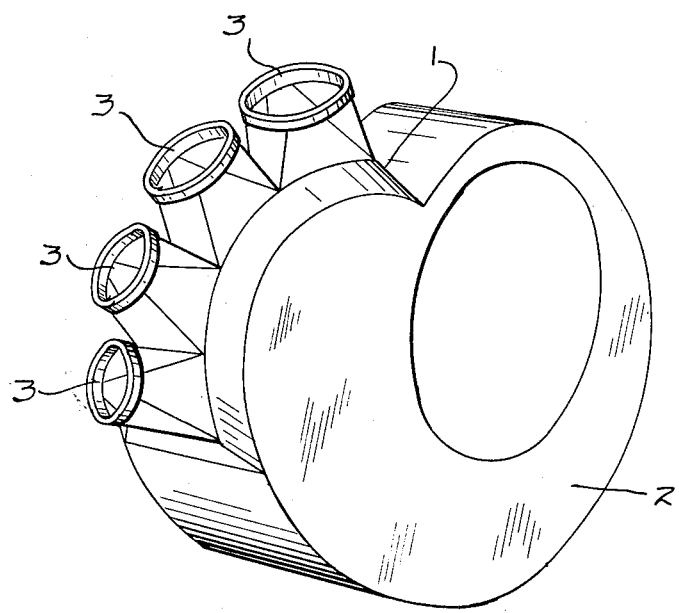
INVENTOR.
KNUD SIGVARDT
BY
ATTORNEY United States Patent Office 2,780,490
Patented Feb. 5, 1957

2,780,490
DEVICE FOR SUBDIVIDING AN AIRSTREAM

Knud Sigvardt, Orehoved, Denmark, assignor to A/S R. Sigvardt, Orehoved, Denmark, a Danish limited company Application August 11, 1953, Serial No. 373,585

Claims priority, application Denmark December 4, 1952

5 Claims. (Cl. 299—29)

The present invention relates to an improved device for subdividing an airstream into two or more separate airstreams serving as carrier for a powder or a fluid to be distributed within a given area.

The main object of the device is to provide a device of this kind by means of which it is possible to obtain an improved distribution of the outflowing air mass intermixed with a powder or a fluid than hitherto has been attainable.

Another object of the invention is to provide a device of the kind in question which may be applied to the outlet of a standard blower device.

A further object of the invention is to provide a device for subdividing an airstream in such a manner that each subdivided airstream is imparted an increased outflowing force and consequently a more effective distribution of the powder or fluid mixed therein.

A still further object of the invention is to arrange the spouts in either one or several parallel rows in a vertical plane so that the subdivided airstreams can be distributed over the entire height of vertical obstacles such as trees in any desired width.

The outlet area of the spouts may, according to the invention either be uniform, or they may differ, e. g. decreasing from the upper spout in a vertical row downwardly.

These and other objects of the invention will be apparent from the following description of an embodiment of the blower casing according to the invention as shown in the single figure of the accompanying drawing.

The blower casing may be attached to a centrifugal blower which may be of any known construction and be driven in any adequate manner. The centrifgual blower casing is indicated by 2, and its outlet 1 is divided into four outlet spouts 3. These spouts 3 have varying cross-sectional outlet areas decreasing gradually from one end of the row of spouts to the other. The center axis of each spout forms an acute angle in relation to the axis of a neighbouring spout. The outlet spouts 3 constitute a rigid part of the blower casing 2 and are disposed in an arc having its centre disposed somewhat lower than the rotation axis of the blower in such a manner that the airstreams mixed with a powder or a fluid are distributed over an area extending from the earth almost vertically upwards. The members for injecting powder or fluid into the air-streams are not shown, but they may be of any conventional type and do not constitute a part of the invention.

The above described spouts are all arranged in a single row and the center axes of two spouts adjacent each other in a row intersect each other rearwardly of the spout outlets at an acute angle. The spouts may, however, also be arranged in two or more parallel rows as long as the center axes of any neighboring spouts intersect at an acute angle rearwardly of the spout outlets.

The invention is not limited to the above described and illustrated construction, since it is possible to alter this within the scope of the invention. Thus the construction may be employed in connection with any type of blower, the casing being provided with a connecting pipe so shaped that it may be connected to the blower in any desired position.

I declare that what I claim is:

1. A blower casing for an insecticide spraying machine, comprising a flat blower housing having a side wall and a rim, the side wall being provided with an air inlet and the rim being provided with an air outlet, a plurality of short rigid air outlet nozzles for direct ejection into the atmosphere arranged in at least one row over the said air outlet, the axis of each nozzle being rectilinear and coinciding with the axis of air flow from the nozzle, and the rearward extension of the axes of any two adjacent nozzles forming a predetermined acute angle to sub-divide the air outlet into a plurality of ducts through which relatively separated air streams may issue in close proximity to each other.

2. The blower casing of claim 1, wherein said nozzles have varying cross-sectional outlet areas.

3. The blower casing of claim 1, wherein the nozzles are arranged in a single row in a vertical plane.

4. The blower casing of claim 1, wherein the nozzles are arranged in a single row forming substantially a semicircle around the upper portion of the casing, the nozzles extending substantially radially from the casing.

5. The blower of claim 2, wherein the nozzles in a single row have gradually decreasing cross-sectional areas from one end of the row to the other.

References Cited in the file of this patent

UNITED STATES PATENTS

| | | |
|---|---|---|
| 1,224,560 | Needham et al. | May 1, 1917 |
| 1,987,656 | Althouse et al. | Jan. 15, 1935 |
| 2,062,295 | Cary et al. | Dec. 1, 1936 |
| 2,390,630 | Wheller | Dec. 11, 1945 |
| 2,545,829 | Spreng | Mar. 20, 1951 |
| 2,554,432 | Walters | May 22, 1951 |
| 2,609,635 | Daugherty | Sept. 9, 1952 |
| 2,670,566 | Tuff | Mar. 2, 1954 |